United States Patent
Pause

(10) Patent No.: US 7,488,773 B2
(45) Date of Patent: Feb. 10, 2009

(54) MATERIAL MADE FROM A SILICONE RUBBER, PRODUCTION PROCESS, AND APPLICATION

(76) Inventor: Barbara Hildegard Pause, 7161 Christopher Ct., Longmont, CO (US) 80503

(*) Notice: Subject to any disclaimer, the term of this patent is extended or adjusted under 35 U.S.C. 154(b) by 310 days.

(21) Appl. No.: 10/502,361

(22) PCT Filed: Jan. 21, 2003

(86) PCT No.: PCT/US03/01785

§ 371 (c)(1), (2), (4) Date: Jul. 21, 2004

(87) PCT Pub. No.: WO03/068414

PCT Pub. Date: Aug. 21, 2003

(65) Prior Publication Data

US 2005/0020768 A1 Jan. 27, 2005

Related U.S. Application Data

(60) Provisional application No. 60/352,007, filed on Jan. 23, 2002.

(51) Int. Cl.
*C08K 5/01* (2006.01)

(52) U.S. Cl. .................. 524/788; 524/787; 524/848; 524/862; 528/15; 528/31

(58) Field of Classification Search .......... 524/788, 524/787, 848, 862; 528/15, 31
See application file for complete search history.

(56) References Cited

U.S. PATENT DOCUMENTS

| | | | |
|---|---|---|---|
| 4,111,189 A * | 9/1978 | Dizon | 126/400 |
| 5,070,223 A | 12/1991 | Colsante | |
| 5,290,904 A * | 3/1994 | Colvin et al. | 428/68 |
| 5,539,020 A * | 7/1996 | Bracken et al. | 523/212 |
| 5,816,493 A | 10/1998 | Pirkle | |
| 6,391,442 B1 * | 5/2002 | Duvall et al. | 428/348 |
| 6,793,856 B2 * | 9/2004 | Hartmann et al. | 264/141 |
| 6,855,410 B2 * | 2/2005 | Buckley | 428/311.11 |
| 2001/0049427 A1 | 12/2001 | Atwood et al. | |

FOREIGN PATENT DOCUMENTS

| WO | 2000/70983 | * 11/2000 |
|---|---|---|
| WO | WO 01/22779 | 3/2001 |

OTHER PUBLICATIONS abstract, JP 61044972 Mar. 1986.*
Derwent Abstract JP 61-044972, Mar. 4, 1986.*
English language translation 61-44972, Mar. 1986.*
English language transltion JP 61-044972 Mar. 1986.*

* cited by examiner

*Primary Examiner*—Margaret G Moore

(57) ABSTRACT

Silicone rubber materials comprising finely divided phase change materials such as crystalline alkyl hydrocarbons or salt hydrates facilitate thermo-regulation due to latent heat absorption and latent heat release in the phase transition range of the phase change material, which improves the thermal performance and enhances the comfort sensation when using the silicon rubber material in item such as car seats, bicycle saddles, diving suits, building materials or medical devices.

12 Claims, No Drawings

MATERIAL MADE FROM A SILICONE RUBBER, PRODUCTION PROCESS, AND APPLICATION

CROSS-REFERENCES TO RELATED APPLICATIONS

This application claims priority of U.S. provisional application Ser. No. 60/352,007 filed Jan. 23, 2002 entitled "Silicone Rubber Materials Containing Phase Change Material". The international application Serial No. PCT/US03/01785 entitled "Material made from silicone rubber, production process, and application" was filed Jan. 21, 2003 and published Aug. 21, 2003.

BACKGROUND OF THE INVENTION

The invention relates to a silicone rubber material containing finely divided phase change materials and a process for producing such a material. The application of materials, which absorb, store and release large quantities of heat during a phase transition, into those materials which do not undergo such a phase transition within the same temperature range, leads to a thermo-regulating effect. This thermo-regulating effect can be used to enhance the thermal performance characteristics and the thermal comfort sensation of a variety of products such as sport garments, diving suits, protective garments, blinds, building materials, medical products, automotive products, etc. substantially.

Phase change material possesses the ability to change its physical state within a certain temperature range. When the melting temperature is obtained during a heating process, the phase change from the solid to the liquid state occurs. During this melting process, the phase change material absorbs and stores a large amount of latent heat. The temperature of the phase change material remains nearly constant during the entire process. In a cooling process of the phase change material, the stored heat is released into the environment in a certain temperature range, and a reverse phase change from the liquid to the solid state takes place. During this crystallization process, the temperature of the phase change material also remains constant. The high heat transfer during the melting process and the crystallization process, both without any temperature change, is responsible for the phase change material's appeal as a source of heat storage.

In order to contrast the amount of latent heat absorbed by a phase change material during the actual phase change with the amount of sensible heat in an ordinary heating process, the ice-water phase change process will be used. When ice melts, it absorbs an amount of latent heat of about 335 J/g. When the water is further heated, it absorbs a sensible heat of only 4 J/g while its temperature rises by one degree C. Therefore, the latent heat absorption during the phase change from ice into water is nearly 100 times higher than the sensible heat absorption during the heating process of water outside the phase change temperature range.

In addition to ice (water), more than 500 natural and synthetic phase change materials are known. These materials differ from one another in their phase change temperature ranges and their heat storage capacities.

Currently, only crystalline alkyl hydrocarbon phase change materials having different chain lengths are used for finishing yarns, textiles and foams. Characteristics of these phase change materials are summarized in Table 1.

TABLE 1

Crystalline alkyl hydrocarbons

| Crystalline alkyl hydrocarbons | Formula | Melting temperature, °C. | Crystallization temperature, °C. | Latent heat storage capacity, J/g |
|---|---|---|---|---|
| Heneicosane | $C_{21}H_{44}$ | 40.5 | 35.9 | 213 |
| Eicosane | $C_{20}H_{42}$ | 36.1 | 30.6 | 247 |
| Nonadecane | $C_{19}H_{40}$ | 32.1 | 26.4 | 222 |
| Octadecane | $C_{18}H_{38}$ | 28.2 | 25.4 | 244 |
| Heptadecane | $C_{17}H_{36}$ | 21.7 | 16.5 | 213 |
| Hexadecane | $C_{16}H_{34}$ | 16.7 | 12.2 | 237 |

The crystalline alkyl hydrocarbons are either used in technical grades with a purity of approximately 95% or they are blended with one another in order to cover specific phase change temperature ranges. The crystalline alkyl hydrocarbons are nontoxic, noncorrosive, and nonhygroscopic. The thermal behavior of these phase change materials remains stable under permanent use. Crystalline alkyl hydrocarbons are byproducts of petroleum refining and, therefore, inexpensive.

Salt hydrates are alloys of inorganic salts and water. The most attractive properties of salt hydrates are the comparatively high latent heat values, the high thermal conductivities and the small volume change during melting. Salt hydrates often show an incongruent melting behaviour which results in a lack in reversible melting and freezing making them unsuitable for permanent use. Salt hydrates with reversible melting and freezing characteristics are summarized in Table 2.

TABLE 2

Salt hydrates

| Salt hydrates | Melting temperature, °C. | Latent heat storage capacity, J/g |
|---|---|---|
| Calcium Cloride Hexahydrate | 29.4 | 170 |
| Lithium Nitrate Trihydrate | 29.9 | 236 |
| Sodium Sulfate Decahydrate | 32.4 | 253 |

In the present applications of the phase change material technology in textiles, only crystalline alkyl hydrocarbon are used which are microencapsulated, i.e., contained in small micro-spheres with diameters between 1 micron and 30 microns. These microcapsules with enclosed phase change material are applied to a textile matrix by incorporating them into acrylic fibers and polyurethane foams or by coating them onto textile surfaces.

U.S. Pat. No. 4,756,958 reports a fiber with integral microspheres filled with phase change material which has enhanced thermal properties at predetermined temperatures.

U.S. Pat. No. 5,366,801 describes a coating where microspheres filled with phase change material are incorporated into a coating compound which is then topically applied to fabric in order to enhance the thermal characteristics thereof.

U.S. Pat. No. 5,637,389 reports an insulating foam with improved thermal performance, wherein micro-spheres filled with phase change material are embedded.

The micro-encapsulation process of crystalline alkyl hydrocarbon phase change materials is a very time-consuming and complicated chemical process running over several stages making the microcapsules with enclosed phase change material very expensive.

In addition to the micro-encapsulation of phase change material, several attempts have been made to contain crystalline alkyl hydrocarbons as well as salt hydrates in certain macro-structures such as a silica powder, or a polyolefin matrix.

U.S. Pat. No. 5,106,520 describes a dry silica powder comprising phase change material.

U.S. Pat. No. 5,053,446 reports a polyolefin composition containing a phase change material and possesses enhanced thermal storage properties.

However, applications of these containment structures have shown that they are not providing a durable containment and the phase change material often disappears while in its liquid stage.

SUMMARY OF THE INVENTION

The invention pertains to silicone rubber materials, which contain finely divided phase change materials such as crystalline alkyl hydrocarbons or salt hydrates. By either heat absorption or heat emission, the phase change material provides a thermo-regulating system which enhances the thermal performance of silicone rubber materials substantially. The structure of the silicone rubber allows for a loading capacity of up to 60 wt. % of crystalline alkyl hydrocarbons or salt hydrates. The newly-invented product can be used, for instance, for building products, cable insulations, thermal protection of technical products, protective garments, medical devices, automotive products and sporting goods such as diving suits.

DETAILED DESCRIPTION OF THE INVENTION

It has been discovered, that crystalline alkyl hydrocarbons and salt hydrates can be durably contained in a silicone rubber matrix whereby the phase change materials are cross-linked into the silicone rubber structure. For this purpose, the phase change material does not need to be microencapsulated. Finely-divided phase change materials emulsified or dispersed in the silicon rubber structure do not flow out of the silicon rubber structure while in a liquid stage. The composition remains stable under substantial temperature variation over a long service time.

There are several methods that can be applied in order to produce silicone rubber. For containing phase change material inside the silicone rubber matrix, the most appropriate method uses liquid silicone rubbers. Liquid silicone rubbers are paste-like flow-able, two-component blends. Liquid silicone rubbers possess a lower viscosity than solid rubbers which especially supports forming the product into a desired shape. Phase change materials (available in a liquid form after melting) can be easily mixed into the two liquid components the basic silicone rubber components consist of.

Liquid silicon rubbers are available in different versions. Some of the standard types provide an exceptional mechanical strength and elasticity. There are liquid silicone rubbers available which cure in a very short period of times. Another liquid silicone rubber system possesses a very high flame resistance. They are all supplied ready for processing. One of the two components contains, for instance, a platinum catalyst and the other component a hydrogen-functional polysiloxane cross-linking agent.

The crystalline alkyl hydrocarbons or the salt hydrates create a third component which needs to be mixed into the system. In principle, all phase change materials with phase transition temperatures in the required temperature ranges for a certain application can be used for incorporation into the silicone rubber matrix. For many applications, the melting temperature of the phase change materials needs to be in a temperature range between 20° C. and 60° C. For most of the garment applications, the melting temperatures of the phase change materials preferably lie in a temperature range between 30° C. and 36° C. For some technical heat protective applications, higher melting temperatures of up to 100° C. may be required.

The crystalline alkyl hydrocarbons or the salt hydrates may be incorporated into the silicone rubber matrix in a weight portion of up to 60 wt. % based on the material's total weight. Preferably, the phase change materials are incorporated into the silicone rubber matrix in weight portions between 20 wt. % and 50 wt. %. These quantities of phase change material ensure a substantial increase in thermal performance. On the other side, the desired mechanical strength, flexibility and hardness characteristics of the silicone rubber material can also be maintained. The hardness could be decreased, if necessary, by further adding silicone fluid.

Before mixing the crystalline alkyl hydrocarbons or the salt hydrates into the two components of the silicone rubber matrix, they need to be liquid. If crystalline alkyl hydrocarbons or salt hydrates are used, which are solid at the processing temperature, they need to be melted first. In order to obtain a certain appearance, color pigments will be added. Otherwise the end product will be vary between transparent and opaque. In order to receive a sufficient adhesion to a prospective carrier structure (textiles, wallpaper etc.), adhesion supportive substances will be added.

All the components are usually transferred by a metering pump from the containers into the metering cylinder of an injection moulding machine. As soon as the components are mixed, the addition-curing mixture starts to cure. The rate of curing depends on the temperature. The higher the temperature, the faster the curing process will be performed. In order to avoid a water separation and evaporation of the water component of salt hydrates, silicone rubber with incorporated salt hydrates should be cured at temperatures below 80° C. Preferable, most silicone rubber systems with incorporated phase change materials shall be cured at room temperature or at a higher temperature of up to 75° C. Addition-curing components do not release any by-products that have to be removed by any form of after-treatment or post-curing.

The silicone rubber with the incorporated phase change material can be poured into moulds and formed into desired shapes preferably without an external pressure. In addition, the silicon rubber material with incorporated crystalline alkyl hydrocarbons or the salt hydrates can be coated onto a textile or another material. Bonding the silicon rubber material with incorporated phase change material to metals or plastics, a primer should be used to achieve a sufficient adhesion between the silicone rubber material and the carrier material.

The silicone rubber made of the described components possesses a very high flame retardancy. Toxic gases are not released during combustion. Furthermore, the silicone rubber possesses a good weathering resistance, UV resistance, and aging resistance. The material can be applied in a temperature range between −50° C. and 200° C.

The structure of the silicone rubber material allows, for instance, a loading capacity of 40 wt. % of crystalline alkyl hydrocarbon phase change materials. In a silicone rubber (standard type) material with a thickness of 2 mm and a weight of 2200 g/m$^2$, a latent heat storage capacity of about 180 kJ/m$^2$ can be obtained by applying crystalline alkyl hydrocarbon phase change materials with a latent heat storage capacity of about 200 J/g. The latent heat storage capacity, which can be obtained in that way, greatly exceeds those of common polyurethane foam materials with microencapsulated phase change materials, which range from 20 kJ/m² to 40 kJ/m². Textiles coated with microencapsulated phase change materials possess latent heat storage capacities between 5 kJ/m² and 15 kJ/m². The latent heat storage capacity of a polyolefin structure of the same thickness containing crystalline alkyl hydrocarbon phase change materials was determined to be in the range of 80 kJ/m² to 100 kJ/m².

Crystalline alkyl hydrocarbons or salt hydrates are permanently locked in the silicone rubber structure and, therefore, can not disappear while in a liquid stage. The mechanical properties, as well as the special features of the silicone rubber material, are not changed by adding these phase change materials in the given quantities. The high thermal conductivity of the silicon rubber material, about 0.2 W/m K, allows for an exceptional heat transfer to and from the phase change material incorporated therein.

EXAMPLES

The following examples describe specific aspects of the invention to illustrate and provide a description of the invention for those of ordinary skills in the art. The examples shot not be constructed as limiting the invention, as the examples merely provide specific methodology useful in understanding and practicing the invention.

Example 1

A liquid silicon rubber supplied as ELASTOSIL® RT 621 by Wacker Silicones Corporation, Adrian, Mich. was used for all of the following investigations. The silicon rubber ELASTOSIL® RT 621 is a pourable, addition-curing, two-component rubber system that vulcanizes at room temperature. The selected silicon rubber shows a fast and non-shrinking cure at room temperature which can be accelerated considerably by the influx of heat. Additional product features are a low hardness, a high tear strength, good adhesion forces and an excellent flow.

In this first example, a technical grade eicosane was used as a phase change material which melts at a temperature at about 36° C. Because the phase change material is solid at room temperature, it was first melted at a temperature above the melting point. The liquid phase change material was than carefully mixed into the component A of the ELASTOSIL® RT 621, the silicone hydrogen-functional polysiloxane cross-linking agent. The catalyst component B was finally added to the two other components in a quantity of 10 wt. % (in reference to the quantity of the component A) and mixed into them. Then, the three-component system was poured into a form and cured for about one hour.

The finished product, i.e. a silicone rubber with 30 wt. % technical grade eicosane was tested in comparison to a silicon rubber made of ELASTOSIL® RT 621 without phase change material. The technical grade eicosane possesses a lower density (about 850 kg/m³) than the silicone rubber (about 1120 kg/m³). This leads to an approximately 8% lower density of the ELASTOSIL® RT 621 silicone rubber with 30 wt. % technical grade eicosane compared to the ELASTOSIL® RT 621 silicone rubber without phase change material. In reference to the same thickness of the test products, the ELASTOSIL® RT 621 silicone rubber with 30 wt. % of technical grade eicosane also shows a weight reduction of about 8% compared to the ELASTOSIL® RT 621 silicone rubber without phase change material.

Both ELASTOSIL® RT 621 silicone rubber plates (with 30 wt. % phase change material and without phase change material) showed a hardness of about 25°, a tensile strength of about 7.3 N/mm² and a tear strength of about 32 N/mm.

The latent heat storage capacity of technical grade eicosane is about 165 J/g. A loading level of 30 wt. % technical grade eicosane in an approximately 8 mm thick silicon rubber plate leads to a latent heat storage capacity of about 50 J/g or 353 kJ/m².

Thermal transfer characteristics such as thermal conductivity, thermal resistance (based on a material thickness of 8 mm), and specific heat capacity are summarized in Table 3.

TABLE 3

Thermal transfer and thermal storage characteristics of the silicone rubber material with and without phase change material

| Material | Thermal conductivity W/mK | Thermal resistance, m²K/W | Specific heat storage capacity, J/g K |
| --- | --- | --- | --- |
| Silicone rubber plate without phase change material | 0.1932 | 0.0414 | 1.671 |
| Silicone rubber plate with 30 wt. % eicosane | 0.1744 | 0.0459 | 1,832 |

Example 2

In the second example, a technical grade hexadecane was used as a phase change material which possesses a melting temperature of about 17° C. Because the phase change material is liquid at room temperature it has been mixed directly into the component A of the ELASTOSIL® RT 621, the silicone hydrogen-functional polysiloxane cross-linking agent. The catalyst component B was then added to the two other components in a quantity of about 10 wt. % (in reference to the quantity of the component A) and mixed into them. Then, the three-component system was poured into a form and also cured for about one hour.

The latent heat storage capacity of technical grade hexadecane is about 220 J/g. A loading level of 30 wt. % technical grade hexadecane phase change material in the about 8 mm thick silicone rubber plate totals a latent heat storage capacity of about 65 J/g or 458 kJ/m².

Example 3

In the third example, ELASTOSIL® RT 621 silicone rubber with 30 wt. % technical grade hexadecane was made using the procedure described in Example 2. However, the three-component system was immediately coated onto the surface of different textile carrier structures and were cured for about one hour.

The thickness of the silicone rubber layer applied to different textile structures, such as an open-cell polyurethane foam product, a spacer fabric and a neoprene/fabric composite, was always enhanced by about 1.7 mm, leading to a total weight increase of about 1500 g/m². The latent heat storage capacity of the phase change material incorporated in this 1.7 mm silicone rubber with 30 wt. % technical grade hexadecane totals a latent heat storage capacity of about 100 kJ/m². Thus, the silicone rubber coating with 30 wt. % of technical grade hexadecane (not micro-encapsulated) provides a substantially higher latent heat storage capacity than the common textile products with microencapsulated phase change material.

Example 4

In this fourth example, a lithium nitrate trihydrate salt hydrate was used as a phase change material which melts at a temperature of about 30° C. Because the phase change material is solid at room temperature, it was first melted at a temperature above the melting point. The liquid phase change material was than carefully mixed into the component A of the ELASTOSIL® RT 621, the silicone hydrogen-functional polysiloxane cross-linking agent. The catalyst component B was finally added to the two other components in a quantity of 10 wt. % (in reference to the quantity of component A) and mixed into them. Then, the three-component system was poured into a form and cured for about one hour.

The lithium nitrate trihydrate phase change material possesses a higher density (about 1550 kg/m$^3$) than the silicone rubber (about 1120 kg/m$^3$). This leads to an approximately 12% higher density of the ELASTOSIL® RT 621 silicone rubber with 30 wt. % lithium nitrate trihydrate compared to the ELASTOSIL® RT 621 silicone rubber without phase change material. In reference to the same thickness of the test products, the ELASTOSIL® RT 621 silicone rubber with 30 wt. % lithium nitrate trihydrate shows also an weight increase of about 12% compared to the ELASTOSIL® RT 621 silicone rubber without phase change material.

The latent heat storage capacity of lithium nitrate trihydrate is about 235 J/g. A loading level of 30 wt. % lithium nitrate trihydrate phase change material in the about 8 mm thick silicone rubber plate leads to a latent heat storage capacity about 70 J/g or 620 kJ/m$^2$.

A silicon rubber matrix with incorporated phase change material can be used, for instance, to enhance the thermal mass of normal roof constructions and membrane roof constructions significantly, which will lead to a better thermal comfort inside such buildings and to substantial energy savings. The silicone rubber with incorporated phase change material may also improve the thermal performance of car seats, bicycle saddles, diving suits, and medical devices, to mention a few examples.

Other objects, features and advantages will be apparent to those skilled in the art. While preferred embodiments of the present invention have been illustrated and described, this has been by way of illustration and the invention should not be limited except as required by the scope of the appended claims.

What is claimed is:

1. A process for producing a silicone rubber material having phase change material, wherein the phase change material is not microencapsulated, including the steps of:
   melting the solid phase change material into a liquid state, then,
   mixing the phase change material while in a liquid state in a silicone rubber cross-linking component,
   mixing a liquid catalyst agent into the silicone rubber cross-linking component with the phase change material therein, and
   converting the three-component system into the silicone rubber material by curing.

2. The process according to claim 1, wherein the phase change material is a crystalline alkyl hydrocarbon.

3. The process according to claim 1, wherein the phase change material is a salt hydrate.

4. The process according to claim 1, wherein the phase change material has a melting point in the range between 24° C. and 60° C.

5. The process according to claim 1, wherein the phase change material has a melting point in the range between 30° C. and 36° C.

6. The process according to claim 1, wherein the phase change material has a melting point of up to 100° C.

7. The process according to claim 1, wherein the phase change material is present in a weight portion of up to 60 wt. %, based on the total weight of the silicone rubber material.

8. The process according to claim 1, wherein the phase change material is present in a weight portion between 20 wt. % and 50 wt. %, based on the total weight of the silicone rubber material.

9. The process according to claim 1, further comprising the step of mixing at least one fire retardant additive, color pigment, or adhesion supportive additive into the silicone rubber cross-linking component with the phase change material therein.

10. The process according to claim 1, wherein the silicone rubber material is created from liquid silicone rubber components.

11. The process according to claim 1, including the step of pouring the three-component system into a form and curing the system therein.

12. The process according to claim 1, including the step of coating the three-component system onto a surface of a textile and curing the system thereon.

* * * * *